United States Patent
Igarashi et al.

(10) Patent No.: US 6,212,024 B1
(45) Date of Patent: Apr. 3, 2001

(54) RECORDING EQUALIZER AND MAGNETIC RECORDING/REPRODUCING APPARATUS PERFORMING WRITE TIMING COMPENSATION

(75) Inventors: Masukazu Igarashi, Kawagoe; Yohji Maruyama, Iruma; Kazuetsu Yoshida, Hidaka; Ikuo Saitoh, Kawasaki, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/085,860

(22) Filed: May 28, 1998

(30) Foreign Application Priority Data

May 30, 1997 (JP) .................................................. 9-141826

(51) Int. Cl.$^7$ ....................................................... G11B 5/09
(52) U.S. Cl. .................................................. 360/51; 65/45
(58) Field of Search ................................. 360/51, 65, 46, 360/45, 40

(56) References Cited

U.S. PATENT DOCUMENTS 4,885,645 * 12/1989 Hashimoto ............................ 360/45

FOREIGN PATENT DOCUMENTS 8-96312   4/1996 (JP) .
8-203006  8/1996 (JP) .

OTHER PUBLICATIONS

IEEE Transactions On Magnetics, vol. 26, Sep. 1990, pp 2298–2302.

* cited by examiner

*Primary Examiner*—Alan T. Faber
(74) *Attorney, Agent, or Firm*—Kenyon & Kenyon

(57) ABSTRACT

A recording equalizer for precompensating of a write timing of magnetic information when the magnetic information is recorded by a magnetic recording head on a magnetic recording medium, includes a buffer for storing a recording object bit and bits before and after said recording object bit, and a calculator for calculating and outputting a precompensation parameter using the bits stored in the buffer by adding an offset C, having a value such as to always delay the write timing of the magnetic information, to an amount of shift determined using the bits stored in the buffer and the head velocity relative to the medium.

9 Claims, 3 Drawing Sheets

FIG.4
A(-2) A(-1) A(0) A(1) A(2) A(3) A(4) A(5)
  0     0    1   0    0    1    1    0
(a) NON-PRECOMPENSATED RECORDING CURRENT PATTERN
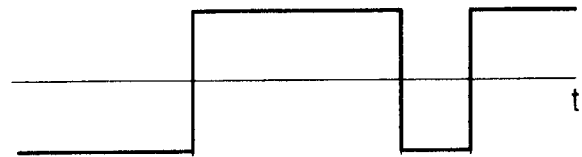
(b) PRECOMPENSATED RECORDING CURRENT PATTERN (WITHOUT OFFSET)
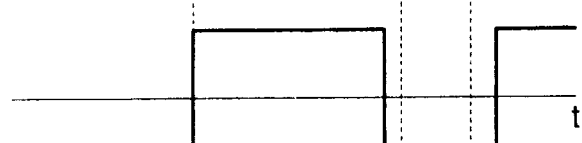
(c) WRITE CLOCK & PRECOMPENSATION PARAMETER (WITHOUT OFFSET)
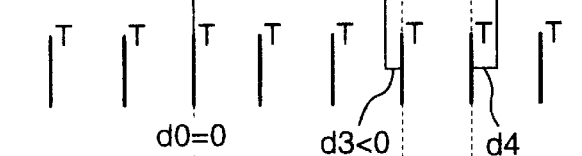
(d) PRECOMPENSATED RECORDING CURRENT PATTERN (WITH OFFSET)
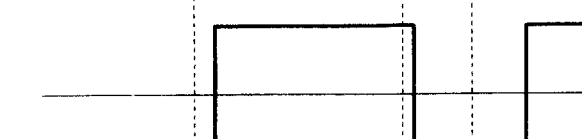
(e) WRITE CLOCK & PRECOMPENSATION PARAMETER (WITH OFFSET)
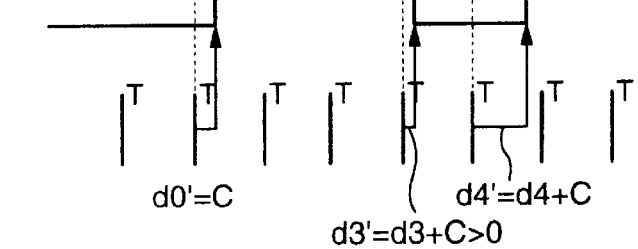

RECORDING EQUALIZER AND MAGNETIC RECORDING/REPRODUCING APPARATUS PERFORMING WRITE TIMING COMPENSATION

BACKGROUND OF THE INVENTION

1. Field of the Invention

This invention relates to a magnetic recording/reproducing apparatus used for an auxiliary recording apparatus of a computer, or the like. More particularly, it relates to a recording equalizer for correcting an interference between adjacent codes that occurs when magnetic information is recorded, and a magnetic recording/reproducing apparatus using the recording equalizer.

2. Description of the Related Art

Demands for a higher density and a higher memory capacity of magnetic disk apparatuses used as an external storage apparatus of a computer have become stronger and stronger with the progress of so-called "information society". The recording density of the magnetic disk apparatuses has become higher at present at an annual ratio of 40 to 60%. Such a rapid progress of the high density has been supported not only by the development of low noise media but also by the introduction of new technologies such as an MR (Magnetoresistive) head and a PRML (Partial Response Maximum Likelihood) system.

In comparison with a conventional 1–7/PD (Peak Detection) system, the PRM1 system records information at a magnetization inversion density (FCI: flux changes per inch) of 1.5 times on a recording medium in the case of the same linear recording density (BPI: bits per inch). Therefore, various counter-measures, which have not been necessary in the past, must be taken in order to cope with various phenomena that occur at a high magnetization inversion density and in a high frequency range. One of such phenomena is a non-linear phenomenon at the time of recording represented by an NLTS (Non-Linear Transition Shift). In the PRML system, in particular, linearity of a recording/reproducing channel is required so as to fully exploit its performance.

In the PRML channel, judgement is done by using an amplitude value obtained by sampling a reproduction waveform and for this reason, sampling at a correct timing and equalization to a correct waveform position are essentially necessary. To achieve this object, the magnetization inversion position to be written by a magnetic head to a recording medium must be controlled correctly. If any demagnetizing field exists inside the medium, however, a head magnetic field is modulated and deviation occurs in the magnetization inversion position to be written. The NLS is the phenomenon in which this magnetization inversion position shifts from the inversion position that is expected from the timing of inversion of a recording current. The inversion of the recording current occurs when recording bits are "1".

Among the influences of the NLTS, the influence from one-previous bit is the greatest, and the magnetization inversion position to be written (the magnetization inversion position expected from the inversion timing of the head magnetic field) is shifted in a direction opposite to a travelling direction of a recording head as viewed from the recording medium. To correct such a shift of the recording position, a control method of a magnetization inversion position, which deviates the inversion timing of the head magnetic field in accordance with a recording pattern and controls the magnetization inversion position to a correct position on a medium (precompensation), has been employed in the past.

One of the methods of precompensating for the NLTS delays the inversion timing by a time corresponding to the shift described above from a timing of a basic clock by considering the magnetic field resulting from the magnetization transition occurred at the one-previous bit and further the two-previous bit. This method is described in IEEE Transactions on Magnetics Vol. 26, No. 5, September 1990, p2298.

When this method, which executes precompensation of the NLTS by delaying the inversion timing, is applied to a magnetic recording apparatus for achieving a recording density of at least 1.5 giga-bit per square inch, however, the magnetization inversion position gets disturbed and an erroneous operation occurs.

On the other hand, JP-A-8-96312 and JP-A-8-203006 describe recording/reproducing apparatus performing the precompensation.

The former describes a circuit for correcting amplitude characteristics and phase characteristics of a recording current and the latter describes a controller of an amplification gain of read data. Nonetheless, both do not consider the influence of the magnetization transition of the following bits of a recording bit.

SUMMARY OF THE INVENTION

It is an object of the present invention to provide a recording equalizer which reduces variance of a magnetization inversion position by improving accuracy of precompensation and is suitable for high density recording, and a magnetic recording apparatus for achieving a recording density of at least 2 giga-bit per square inch by using the recording equalizer.

The recording equalizer for accomplishing the object of the invention described above employs the following construction and has the following features.

The recording equalizer is for precompensating for a write timing of magnetic information when the magnetic information is recorded with a magnetic recording head on a magnetic recording medium, and includes a precompensation parameter calculator for calculating a precompensation parameter. The precompensation parameter calculator adds an offset C so that the write timing of the magnetic information is precompensated always in a delaying direction, and outputs the precompensation parameter. Assuming that a precompensation parameter when a first bit of a isolated dibit spaced apart by at least a 3-bit length from a previous transition and by at least a 2-bit length from a following transition is A, the offset C is decided so that A becomes positive and is smaller than a write basic clock cycle.

BRIEF DESCRIPTION OF THE DRAWINGS

FIG. 4 is an explanatory view showing the comparison of a write current pulse waveform of the present invention with a waveform of the prior art.

DESCRIPTION OF THE PREFERRED EMBODIMENTS

Hereinafter, a preferred embodiment of the present invention will be explained with reference to the accompanying drawings.

(1) Construction of Recording Equalizer

Figure 1:
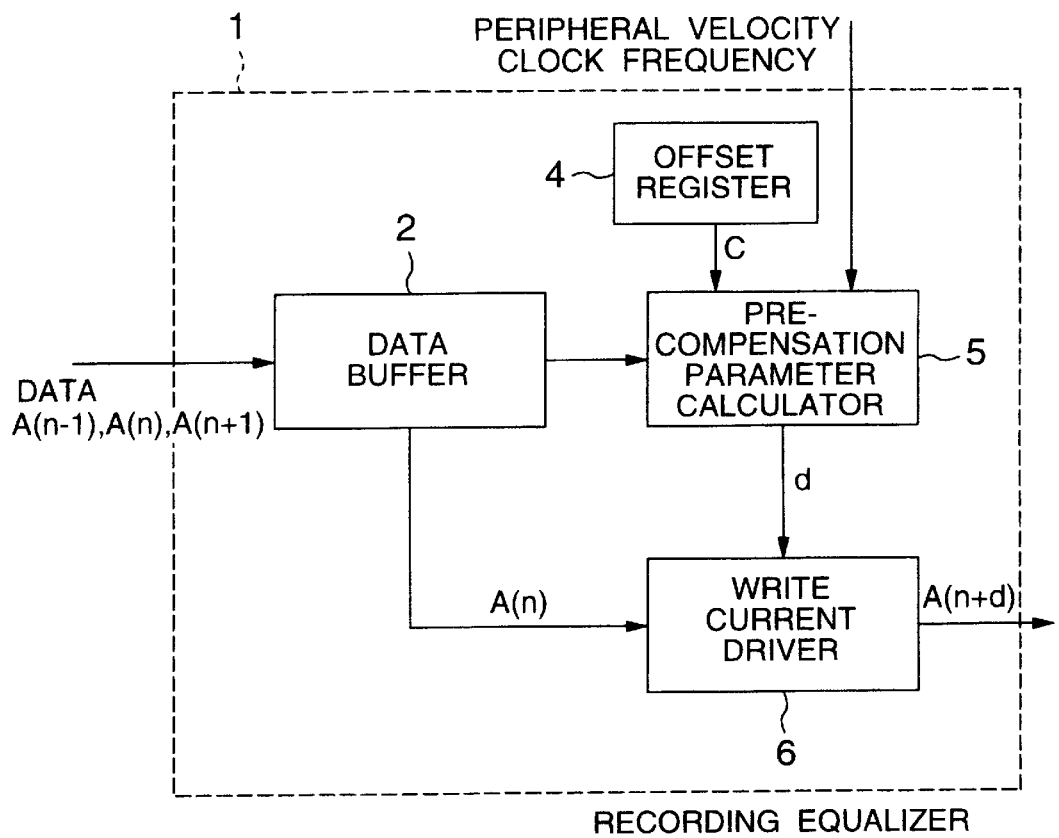
FIG. 1 is a basic structural view of a recording equalizer according to the present invention.

FIG. 1 shows a basic construction of a recording equalizer according to the present invention. The recording equalizer 1 includes a data buffer 2, an offset register 4, a precompensation parameter calculator 5 and a write current driver 6.

Each bit A(n−1), A(n), A(n+1),—of write data is inputted to the data buffer 2. Assuming that a write object bit is A(n), at least previous bits A(n−2) and A(n−1) and a following bit A(n+1) are stored in the data buffer 2 besides the write object bit A(n). The data buffer 2 has a function of transferring these bit information to the precompensation parameter calculator 5 and the write current driver 6 at any time.

The precompensation parameter calculator 5 includes a microprocessor and a memory. The precompensation parameter calculator 5 calculates a precompensation parameter d using the bit sequence sent from the data buffer 2 and the value C of the offset register 4. Since a relative velocity (peripheral velocity) between a recording medium and a magnetic head and a basic frequency (write frequency: frequency of a write PLL circuit) determined by the highest recording density are necessary for this calculation, these values are inputted from the outside. The calculation method of this precompensation parameter will be described later.

After calculating the precompensation parameter d, the precompensation parameter calculator 5 delivers this value d to the write current driver 6. The write current driver 6 has a function of inverting a current polarity in such a manner as to correspond to the A(n) information. In other words, the write current driver 6 inverts the current polarity only when A(n) is a "1" bit.

The write current driver 6 delays this current polarity inversion timing by a time corresponding to the precompensation parameter d.

(2) Calculation Method of Precompensation Parameter

First, an approximate expression used for calculating the precompensation parameter d is determined.

Incidentally, a "11" portion in a bit sequence "-0110-" is referred to as a "dibit". In this dibit, the current polarity inversion occurring at the first "1" portion is referred to as the "first transition" and the current polarity inversion occurring at the second "1" portion, as the "second transition".

The dibit is written to a recording medium by inverting a head magnetic field in accordance with a write clock, that is, under the state where the precompensation is not effected, and a position of actual magnetization inversion on the medium is measured. The difference between the head magnetization inversion position and the magnetization inversion position on the medium is represented by the distance on the medium and is referred to as a "shift".

To measure this shift, a dibit spaced apart by at least a three-bit length from a previous transition and by at least a two-bit length from a following transition, such as "-00110-", is hereby used. The dibit of this type is referred to as an "isolated dibit".

Figure 2:
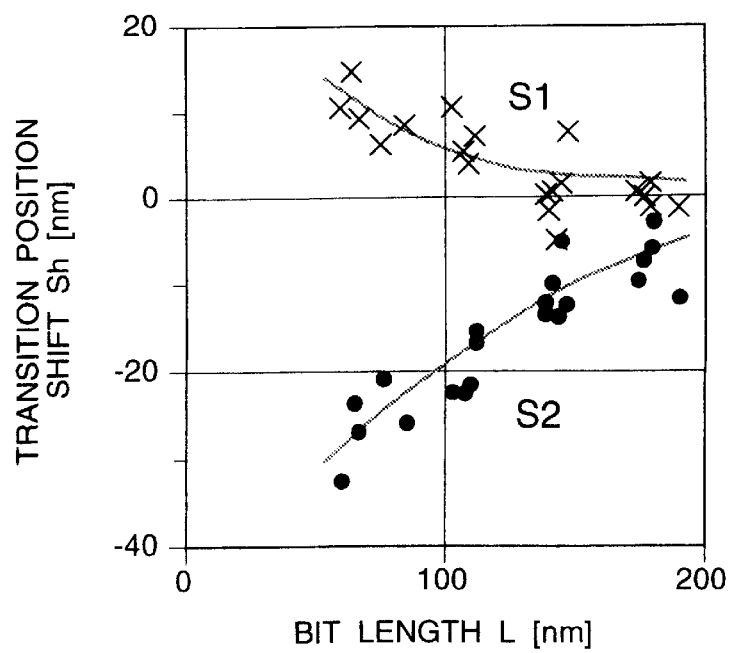
FIG. 2 is a diagram showing the relationship between a bit length to be written and a shift of a transition position.

FIG. 2 shows the result of a measurement of the first transition shift S1 and the second transition shift S2 when several dibits are recorded on a magnetic recording medium having a film thickness of 30 nm and a coercive force of 2,400 Oe by using an inductive head having a gap of 200 nm at a recording current of 40 mA. One bit length L of the dibit is plotted on the abscissa and the deviation of the transition positions to be written (expected from the inversion timing of the head magnetic field) from the magnetization inversion position, that is, the shift Sh, is plotted on the ordinate of the diagram. The travelling direction of the recording head as viewed from the recording medium represents the positive direction of the ordinate.

It can be appreciated from FIG. 2 that the smaller the bit length L, the greater the first and second transition shifts S1 and S2. The second transition shift S2, for example, exhibits a shift of 9 nm at a bit length of 150 nm and a shift of 20 nm at a bit length of 100 nm in the direction opposite to the travelling direction of the recording head. In this instance, the first transition shift S1 is 32% of the second transition shift S2 at the respective bit lengths in the opposite direction (or in the travelling direction of the recording head). These relationships can be approximated by the following expressions 1 and 2 by representing the bit length L and the transition shifts (S1 and S2) in the m unit:

$$S2 = -2\times 10^{-22}/L^2 = f(L)(m) \qquad \text{expression 1}$$

$$S1 = -R \times S2 \text{ (where } R=0.32)(m) \qquad \text{expression 2}$$

where f(L) means a function of the bit length L.

The approximate expressions need not always assume the forms of the expressions 1 and 2 and may assume any forms so long as they can approximate the transition shifts for the bit length. For example, the transition shifts for necessary bit lengths may be stored in advance in the form of a table. Generally, the ratio R described above is calculated by measuring several second transition shifts S2 for the bit length L so as to establish a simple approximate expression and examining further at least one first transition shift S1.

FIG. 4 is an explanatory view showing the relationship between a write current pulse waveform which is not precompensated and a write current pulse waveform which is precompensated and a relationship between a write clock and a precompensation parameter. Timechart (a) shows a current pulse waveform for writing information A(−2) to A(5). Timecharts (b) and (c) are explanatory views of a precompensation method without setting an offset and timecharts (d) and (e) are explanatory views of a precompensation method which sets the offset C.

The explanation will be given hereby about the case where a bit sequence "001001100" is recorded on the medium in a bit length of 100 nm, by way of example. In this bit sequence, A(0) satisfies the condition of an isolated transition while A(3) and A(4) satisfy the condition of an isolated dibit. If recording is done at this original inversion timing, the transition position of A(3) shifts in a phase delay direction by about 8 nm while the transition position of A(4) shifts in a phase advance direction by about 20 nm as shown in FIG. 2. The precompensate for these shifts, the inversion timing of the write current should be regulated so that the phase of A(3) advances by 8 nm while that of A(4) delays by 20 nm.

Timechart (b) shows an example of the write current pattern the inversion timing of which is regulated so that the phase of A(3) advances by 8 nm while that of A(4) delays by 20 nm. In other words, as shown in timechart (c), the first transition A(3) of the isolated dibit is advanced by d3 from the write clock T while the second transition A(4) is delayed by d4 from the write clock T. Recording precompensation is not done for the isolated transition A(0) (d0=0) in timechart (c). To execute this precompensation, however, circuits and a write current driver for advancing the inversion timing in A(3), that is, for enabling negative precompensation d3 in timechart (c) are necessary, and that results in the increase of the production cost. To avoid this negative precompensation, therefore, the offset C is added to the precompensation parameter dn in (c).

When the offset C shown in (d) is set, the waveform of the write current is exactly the same as that of the precompensated waveform shown in (b) with the exception of the overall phase shift (offset C). Each precompensation parameter d0', d3', d4' does not become negative as shown in (e) if an appropriate offset C is set in advance and the offset C is applied to all the bits. Therefore, the circuits for executing negative precompensation are not necessary.

Next, the calculation principle of the precompensation parameter d such as d3', d4', etc, shown in (e) will be explained. The approximate expressions 1 and 2 obtained from FIG. 2 are used for this calculation. The precompensation parameter dn' of A(n) is given by the following expression 3:

$$dn' = (-f(2L) \cdot A(n-2) \cdot (-1)^{A(n-2)+A(n-1)} - f(L) \cdot A(n-1) \cdot (-1)^{A(n-1)} - R \cdot f(L) \cdot A(n+1))/v + C(S) \quad \text{expression 3}$$

where f( ): function of expression 1

L: length of one bit (m)

v: head-medium relative velocity (peripheral velocity) (m/s)

The first term of the expression 3 takes the influences into consideration when any transition exists in the two-previous bit A(n−2) while the second term takes the influences into consideration when any transition exists in the one-previous bit A(n−1). The third term takes the influences into consideration when any transition exists in the one-following bit A(n+1). The value R is in the expression 2 obtained from FIG. 2, which is 0.32. The last term of the expression 3 is the offset C.

Here, the length L of one bit is expressed by the following expression 4:

$$L = v/fw \text{(m)} \quad \text{expression 4}$$

where fw: basic write clock frequency (Hz)

Alternatively, the length L of one bit can be determined from the following expression 5 where S is the disk rotation number per minute and r is the distance of the head position from the disk spindle:

$$L = 2\pi \cdot r \cdot S/60 \, fw \text{(m)} \quad \text{expression 5}$$

The head position may be obtained from a control signal of an actuator for driving the head, or the head position may be written in advance to the leading part of the sector of the medium.

The offset C is set in such a fashion that the precompensation parameter of the first bit of the isolated dibit does not become a negative value and moreover, it is smaller than the cycle of the basic clock.

$$\frac{1}{fw} > C > \frac{S1}{v}(s) \quad \text{expression 6}$$

More correctly, the offset C varies with a recording density and a peripheral velocity. Since they are different between the inner periphery of the medium and its outer periphery, the value C calculated by the expression 6 becomes greater at positions closer to the inner periphery. To simplify the circuit, however, the offset C satisfying the expression 6 is selected for the case where the recording density attains the highest (generally, the innermost periphery), and this C value is applied to the entire portions. In other words, this C value is stored as a constant in the offset register 4 (shown in FIG. 1).

In this way, the precompensation parameter d for recording A(n) can be calculated from the peripheral velocity, the clock frequency and the bit sequence.

The afore-mentioned expressions 2 and 3 employ R as the constant. Though this R value of 0.32 is determined from the actual measurement values of the shifts S1 and S2, the value varies with the medium and the head used.

Table 1 illustrates the ratio R (R=−S1/S2) of the first transition shift S1 to the second transition shift S2 measured for the combinations of various media and heads. In Table 1, the term "high density recording" represents recording at 250 kFCI. The term "excellent" represents an S/N ratio of at least 30 dB, the term "good" represents an S/N ratio of 26 to 30 dB, the term "fair" represents an S/N ratio of 22 to 26 dB and the term "inferior" represents an S/N ratio of less than 22 dB.

TABLE 1

| recording condition | | | | |
|---|---|---|---|---|
| medium coercive force | recording head gap | recording current | R value | high density recording |
| 2400 Oe | 200 nm | 40 mA | 0.32 | good |
| 2400 Oe | 400 nm | 40 mA | 0.59 | fair |
| 2400 Oe | 600 nm | 40 mA | 0.70 | inferior |
| 2400 Oe | 200 nm | 30 mA | 0.35 | good |
| 2400 Oe | 200 nm | 60 mA | 0.35 | good |
| 2600 Oe | 200 nm | 40 mA | 0.25 | excellent |
| 2800 Oe | 200 nm | 40 mA | 0.16 | excellent |

It can be appreciated from Table 1 that high density recording can be done when the value R is smaller than 0.6. Though a Co—Pt alloy is used for the medium and a Ni—Fe alloy is used for the write head material in this examination, the value R can be lowered to about 0.05 by improving further the coercive force of the medium and the saturation flux density of the head material and narrowing the gaps.

Practically, therefore, the value R that can be applied to the expression 3 satisfies the following relationship:

$$0.05 < R < 0.6$$

When R is smaller than 0.05, a sufficient recording density cannot be obtained and when it is greater than 0.6, a reproduction output cannot be obtained.

(3) Magnetic Recording/Reproducing Apparatus

Figure 3:
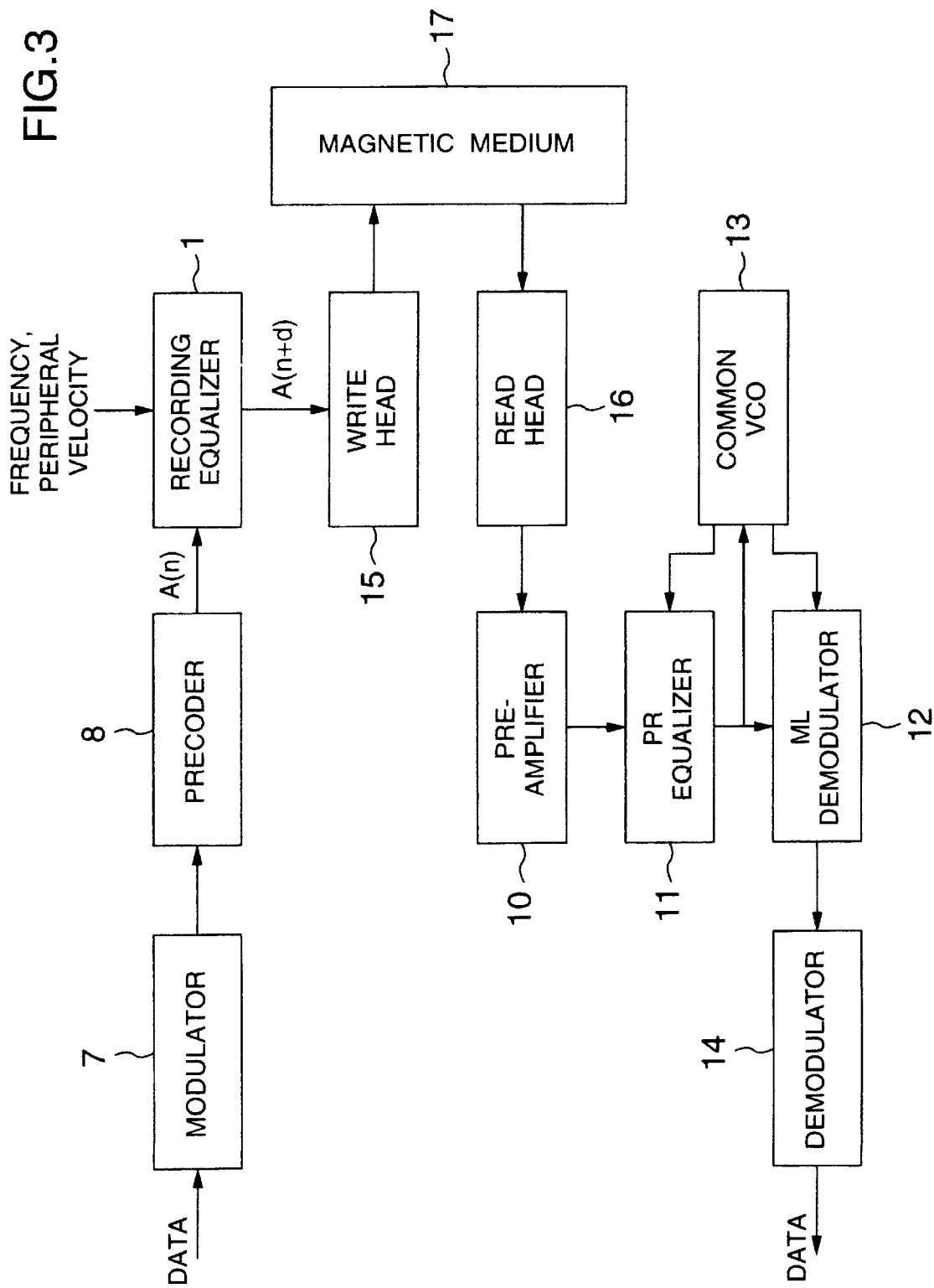
FIG. 3 is a structural view of a signal processor of a magnetic recording apparatus according to the present invention.

FIG. 3 is a block diagram of a signal processor of a magnetic recording/reproducing apparatus including the recording equalizer described in section (1). Recording information (data) is first inputted to a modulator 7. The modulator 7 processes the original data in accordance with a predetermined rule so that "0"s exceeding a predetermined number do not exist. The output of this modulator 7 is sent to a precoder 8. The precoder 8 processes the data into a code which is strong to interference between adjacent signals. For example, the precoder 8 equalizes data "00100" to "001100". The output signal from the precoder 8 is hereby called "A(n)". The A(n) signal is sent to the recording equalizer 1 shown in FIG. 1. The processing in the recording equalizer 1 is the same as the processing described already.

The output from the recording equalizer 1 is assumed to be A(n+d). Here, the value d represents the difference (precompensation parameter) between the write basic clock and the timing at which the actual write operation is made. The precompensation parameter d is calculated, and is controlled, by the recording equalizer 1 as already described. The output from the write current driver (see FIG. 1) disposed in the last stage of the recording equalizer 1 is sent to the write head 15. This output is hereby recorded as the magnetic information on the recording medium 17 by the electro-magnetic conversion operation.

When this magnetic information is read out, it is again converted to electric signals by using the electromagnetic conversion operation by a read head 16. The write head 15 may be used also as the read head 16. When the read head 16 is separated from the write head 15, a magnetoresistive (MR) device or a giga-magnetoresistive (GMR) device can be used because they have a high sensitivity and are suitable for high density recording. Since the electric signals from the read head 16 are weak, the signals are first inputted to a pre-amplifier 10 and then to a PR equalizer 11 and an ML decoder 12.

The PR equalizer 11 executes the inverse conversion to that of the processing of the precoder 8. For example, it executes the inverse conversion of the information "001100" to "100100". In this instance, the inverse conversion is done to the "1" and "0" information by conducting a comparison processing of the reproduction waveform with a learning waveform which inputs in advance an inter-code interference. The ML decoder 12 executes decoding in accordance with the rule provided in advance to the modulator output on the basis of the information of several-bits before and after the reproduced information.

The operations of these PR equalizer 11 and ML decoder 12 should be done at a predetermined operation timing. Otherwise an erroneous information would be decoded. It is easily understood by those skilled in the art. Therefore, the PR equalizer 11 and the ML decoder 12 acquire their operation timing by using the output of a common VCO (voltage control oscillator) 13. Finally, the information is serially inputted to the demodulator 14 and the inverse conversion is done to the original form of the recording information (the form containing continuation of "0").

This magnetic recording apparatus controls the magnetization area recorded on the recording medium (the gap between magnetization transitions) to some multiples of the one-bit length and for this reason, the rotation of the disk should be stabilized time-wise. The operations such as the reference of the timing at which new information is stored in the data buffer and the reference of the timing using which as a base the recording current is inverted are synchronized with the same basic write clock in the recording equalizer and consequently, the control described above can be carried out highly accurately.

(4) Modified Embodiment

The afore-mentioned precompensation parameter calculator 5 inputs with the bit sequence, the peripheral velocity, the clock frequency and the offset, and calculates the pre-compensation parameter for each bit. Instead, it is possible to employ a circuit construction in which a bit judgement circuit is interposed between the data buffer 2 and the pre-compensation parameter calculator 5 and a correspondence table among the bit sequence, the peripheral velocity, the clock frequency and the precompensation parameter is installed inside the precompensation parameter calculator 5. The precompensation parameters are calculated in advance and stored in the table. In this case, the offset C should be determined while taking the recording density and the peripheral velocity into consideration.

The embodiment described above uses the information A(n−2) of up to the two-previous bit for calculating the precompensation parameter of A(n). Generally, the information A(n−1) up to one-previous bit should be used to improve the speed, and the information up to further one-previous bit should be used to accomplish a higher density. The information up to one-previous bit should be used at a recording density of about 150 kFCI and the information up to three-previous bit must be used beyond a recording density of 300 kFCI. Therefore, the capacity of the data buffer and the number of terms of the calculation expression of the precompensation parameter vary with the recording speed and the recording density that are applied.

What is claimed is:

1. A recording equalizer for precompensating of a write timing of magnetic information when the magnetic information is recorded by a magnetic recording head on a magnetic recording medium, comprising:

a buffer for storing a recording object bit and bits before and after said recording object bit; and a calculator for calculating and outputting a precompensation parameter using the bits stored in said buffer by adding an offset C, having a value such as to always delay the write timing of the magnetic information, to an amount of shift determined using the bits stored in the buffer and the head velocity relative to the medium.

2. A magnetic recording/reproducing apparatus including said recording equalizer according to claim 1.

3. A recording equalizer for precompensating of a write timing of magnetic information when the magnetic information is recorded by a magnetic recording head on a magnetic recording medium, comprising:

a buffer for storing a recording object bit and bits before and after said recording object bit; and a calculator for calculating and outputting a precompensation parameter using the bits stored in said buffer by adding an offset C, having a value such as to always delay the write timing of the magnetic information, to an amount of shift determined using the bits stored in the buffer and the head velocity relative to the medium, wherein, when a precompensation parameter is assumed to be d when a first bit of a dibit spaced apart by at least a three-bit length from a previous transition and by at least two-bit length from a following transition is recorded, said offset C is determined to have a value such that said precompensation parameter D is positive and is smaller than a write basic clock cycle.

4. A recording equalizer according to claim 3, wherein said calculator further uses a one-bit length on said magnetic recording medium when said precompensation parameter is calculated.

5. A recording equalizer according to claim 3, wherein said calculator calculates said precompensation parameter of said recording object bit by linearly adding the interference resulting from a magnetization transition existing at a bit which is two bits before said recording object bit, the interference resulting from a magnetization transition existing at a bit which is two bits before said recording object bit and the interference resulting from a magnetization transition existing at a bit which is one bit after said recording object bit, and adding further said offset C.

6. A recording equalizer for precompensating of a write timing of magnetic information when the magnetic information is recorded by a magnetic recording head on a magnetic recording medium, comprising:

a buffer for storing a recording object bit and bits before and after said recording object bit; and a calculator for calculating and outputting a precompensation parameter using the bits stored in said buffer by adding an offset C, having a value such as to always delay the write timing of the magnetic information, to an amount of shift determined using the bits stored in the buffer and the head velocity relative to the medium, wherein:

when a precompensation parameter is assumed to be d when a first bit of a dibit spaced apart by at least a three-bit length from a previous transition and by at least two-bit length from a following transition is recorded, said offset C is determined to have a value such that said precompensation parameter d is positive and is smaller than a write basic clock cycle:

said calculator further uses the length of one-bit length on said magnetic recording medium when said precompensation parameter d is calculated; and when recording A(n) of a bit sequence A(n−2), A(n−1), A(n), A(n+1), said precompensation parameter d is calculated in accordance with the following expression:

$$d=(-f(2L)\cdot A(n-2)\cdot(-1)^{A(n-2)+A(n-1)}-f(L)\cdot A(n-1)\cdot(-1)^{A(n-1)}-R\cdot f(L)\cdot A(n+1))/v+C(S)$$

where
f( ): function for obtaining shift from bit length L
v: head-medium relative velocity (m/s)
L: one-bit length (m)
R: constant.

7. A recording equalizer according to claim 6, wherein said R is expressed by $$R=-S1/S2$$

where S1 is a first transition shift when storing a first bit of a dibit spaced apart by at least a three-bit length from a previous transition and by at least a two-bit length from a following transition and S2 is a second shift when storing the second bit of the dibit, and S1 and S2 are determined by an actual measurement or/and an approximate expression.

8. A recording equalizer according to claim 7, wherein said R satisfies the following relationship:

$$0.05<R<0.60.$$

9. A recording equalizer according to claim 5 wherein $$f(L)=-2\times10^{-22}/L^2(m).$$

* * * * *